US006877717B2

(12) United States Patent
Collins et al.

(10) Patent No.: US 6,877,717 B2
(45) Date of Patent: Apr. 12, 2005

(54) CONTROL VALVE FOR A VEHICULAR BRAKE SYSTEM

(75) Inventors: David E. Collins, Dearborn, MI (US); Wendell D. Tackett, Ann Arbor, MI (US); Patrick H. Hool, St. Clair, MI (US); Herbert L. Linkner, Jr., Dexter, MI (US)

(73) Assignee: Kelsey-Hayes Company, Livonia, MI (US)

( * ) Notice: Subject to any disclaimer, the term of this patent is extended or adjusted under 35 U.S.C. 154(b) by 0 days.

(21) Appl. No.: 10/389,459

(22) Filed: Mar. 14, 2003

(65) Prior Publication Data

US 2004/0178378 A1 Sep. 16, 2004

(51) Int. Cl.[7] ............................................. F16K 31/02
(52) U.S. Cl. ................... 251/129.15; 335/261; 335/279
(58) Field of Search ...................... 251/121.15; 335/261, 335/279

(56) References Cited

U.S. PATENT DOCUMENTS

| 2,407,963 | A | * | 9/1946 | Persons ...................... 335/261 |
| 3,168,242 | A | * | 2/1965 | Diener ....................... 335/261 |
| 4,604,600 | A | * | 8/1986 | Clark ......................... 335/279 |
| 5,364,067 | A | * | 11/1994 | Linkner, Jr. ............. 251/129.15 |
| 5,467,961 | A | * | 11/1995 | Sausner et al. ......... 251/129.15 |
| 5,565,832 | A | * | 10/1996 | Haller et al. ................. 335/279 |
| 5,895,026 | A | * | 4/1999 | Linkner et al. ......... 251/129.15 |
| 6,065,734 | A | * | 5/2000 | Tackett et al. .......... 251/129.02 |
| 6,268,784 | B1 | * | 7/2001 | Feigel et al. ................. 335/261 |
| 6,397,891 | B1 | * | 6/2002 | Neuhaus et al. ....... 251/129.08 |
| 6,453,930 | B1 | * | 9/2002 | Linkner et al. ........ 251/129.15 |
| 6,578,817 | B1 | * | 6/2003 | Otsuka et al. ......... 251/129.02 |

* cited by examiner

*Primary Examiner*—John Bastianelli
(74) *Attorney, Agent, or Firm*—MacMillan, Sobanski & Todd LLC

(57) ABSTRACT

A control valve for controlling fluid flow in a hydraulic control unit of a vehicular brake system includes a valve seat. A sleeve is mounted on the valve seat. An armature core is slidably received in the sleeve. The sleeve includes a first ferromagnetic portion adjacent the valve seat, a second ferromagnetic portion, and an annular region defining an area of increased magnetic reluctance. A part of the first portion of the sleeve defines a radial magnetic pole for the generally radial flow of magnetic flux from the armature to the sleeve. A portion of the valve seat adjacent the armature defines an axial magnetic pole for the generally axial flow of magnetic flux from the armature to the valve seat. Together, the generally radial flow of flux and the generally axial flow of flux generate a force urging the armature from an open position toward a closed position when the coil is energized.

44 Claims, 10 Drawing Sheets

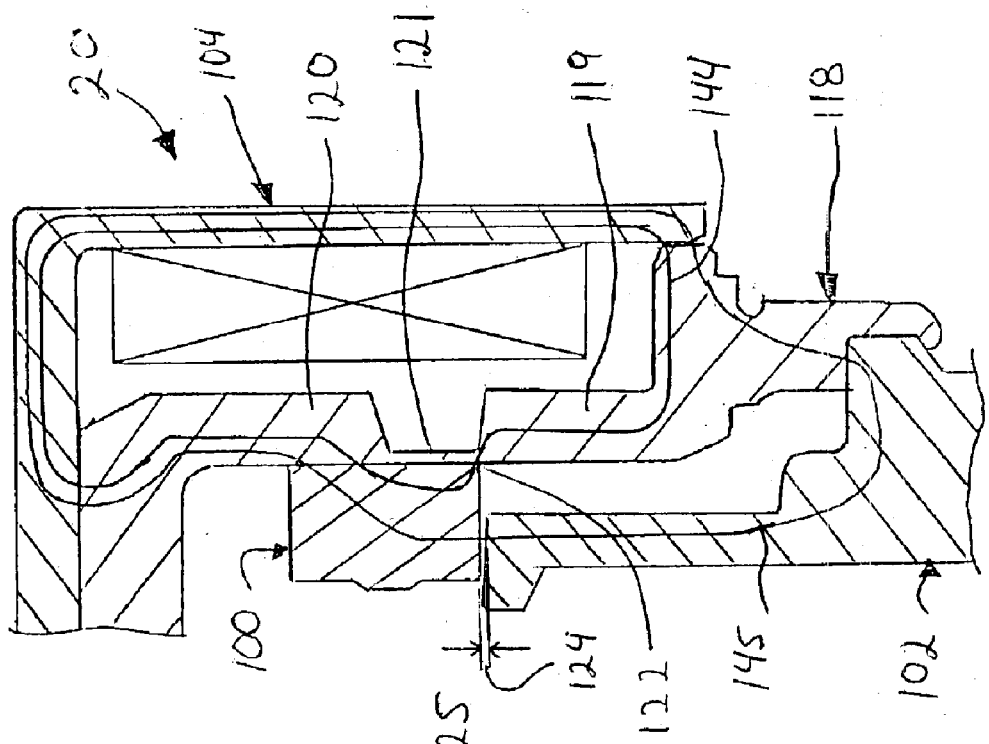
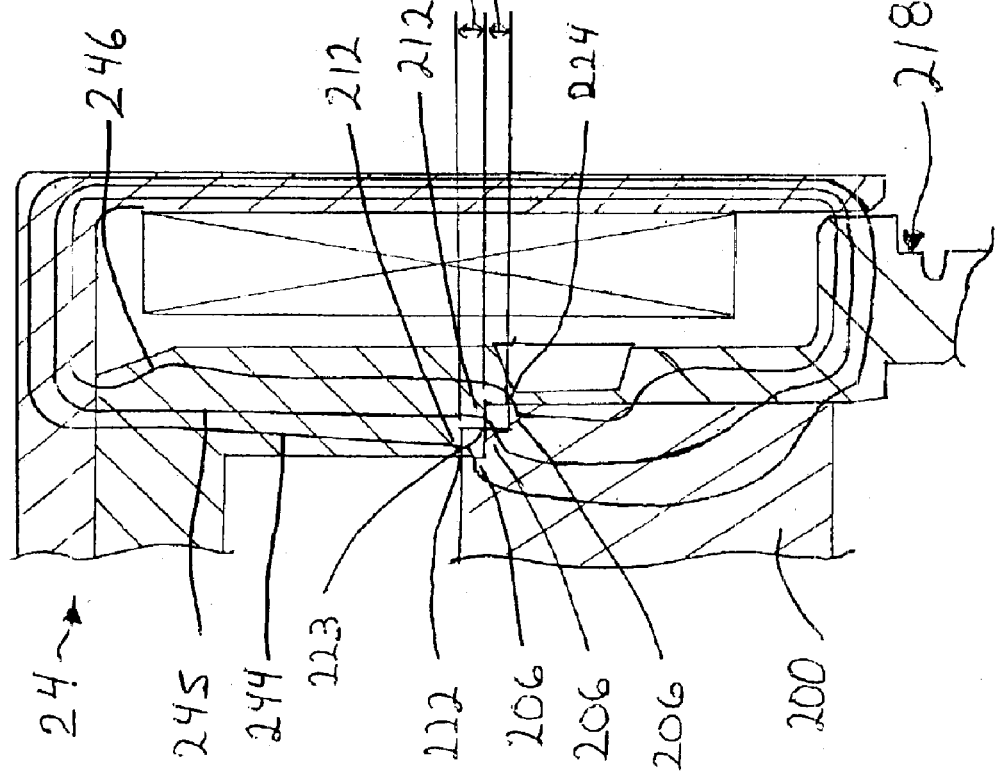

CONTROL VALVE FOR A VEHICULAR BRAKE SYSTEM

BACKGROUND OF THE INVENTION

This invention relates to vehicular brake systems, and more particularly to an improved control valve mounted in a hydraulic control unit of an electronically controlled brake system.

Electronically controlled brake systems for vehicles are well known. One type of electronically controlled brake system includes a hydraulic control unit (HCU) connected in fluid communication between a master cylinder and a plurality of wheel brakes. The HCU typically includes a housing containing control valves and other components for selectively controlling hydraulic brake pressure at the wheel brakes.

Control valves for HCU's are commonly formed as electronically actuated solenoid valves. A typical solenoid valve includes a cylindrical armature slidably received in a sleeve or flux tube for movement relative to a valve seat. A spring is used to bias the armature in an open or closed position, thereby permitting or blocking fluid flow through the valve, respectively. A coil assembly is provided about the sleeve. When the valve is energized, an electromagnetic field or flux generated by the coil assembly causes the armature to slide from the biased open or closed position to a closed or open position, respectively.

Control valves mounted in a HCU are actuated by an electronic control module to provide desired braking functions such as anti-lock braking, traction control, and vehicle stability control.

To provide desired braking responses, an armature must respond quickly and in a predictable manner to an electromagnetic field generated by an energized coil assembly.

SUMMARY OF THE INVENTION

This invention relates to a control valve for controlling fluid flow in a hydraulic control unit of a vehicular brake system. The control valve includes a valve body. The valve body includes a first body portion and a second body portion adjacent the first body portion. The second body portion has a bore formed therein. An armature includes a first end and is slidably received in the bore of the second body portion. The first end of the armature provides a first generally radial flux flow path and at least one of a second generally radial flux flow path and a generally axial flux flow path. An electrical coil is disposed about the valve body for selectively inducing a magnetic flux in the armature.

In one embodiment of the invention, the first body portion is a valve seat, and the second body portion is a sleeve mounted on the valve seat. The sleeve includes a first ferromagnetic portion adjacent the valve seat, a second ferromagnetic portion, and an annular region defining an area of increased magnetic reluctance between the first ferromagnetic portion and the second ferromagnetic portion of the sleeve. At least part of the first portion is adjacent the region of increased magnetic reluctance, the part of the first portion defining a radial magnetic pole for the generally radial transmission of magnetic flux from the armature to the sleeve. The armature includes a body slidably received in the sleeve, at least a portion of the valve seat adjacent the first end of the armature defines an axial magnetic pole for the generally axial transmission of magnetic flux from the first end of the armature to the valve seat.

Preferably, a portion of the sleeve in which a circumferentially extending groove is formed defines the annular region of increased magnetic reluctance. The armature further includes a second end formed of non-ferromagnetic material and axially opposite to the first end. Preferably, the armature is disposed at an extreme of travel away from the first body portion when the coil is deenergized such that the control valve is in an open position. The armature is preferably disposed at an extreme of travel toward the first body portion when the coil is energized, such that the control valve is in a closed position. A spring engages the armature to urge the armature away from the first body portion when the control valve is in the open position. The first body portion defines a valve seat of the control valve, and the armature cooperates with the valve seat to block fluid flow through the control valve when v armature is in a closed position. Fluid flow through the control valve is not blocked when the armature is in an open position. The flow of flux through the first generally radial flux flow path and the flow of flux through the generally axial flux flow path generates a force urging the armature from the open position toward the closed position when the coil is energized.

In an alternate embodiment of the invention, the first body portion is a valve seat, and the second body portion is a sleeve mounted on the valve seat. The sleeve includes a first ferromagnetic portion adjacent the valve seat, a second ferromagnetic portion, and an annular region defining an area of increased magnetic reluctance between the first ferromagnetic portion and the second ferromagnetic portion of the sleeve. A stepped portion is formed on an inner surface of the sleeve. The first end of the armature includes a stepped portion formed on an outer surface of the first end. The stepped portion of the first end of the armature is complementary to the stepped portion formed on the inner surface of the sleeve and includes at least two steps. The stepped portion of the sleeve is adapted to receive the stepped portion of the armature. At least two steps of the stepped portion of the armature form radial magnetic poles for the generally radial transmission of magnetic flux from each of the steps of first end of the armature to respective associated steps of the stepped portion of the sleeve.

Preferably, a portion of the sleeve in which a circumferentially extending groove is formed defines the annular region of increased magnetic reluctance. The armature is disposed at an extreme of travel toward the first body portion when the coil is deenergized such that the control valve is in a closed position. The armature is disposed at an extreme of travel away from the first body portion when the coil is energized, such that the control valve is in an open position. A spring engages the armature to urge the armature toward the first body portion when the control valve is in a closed position. The first body portion defines a valve seat of the control valve, and the armature cooperates with the valve seat to block fluid flow through the control valve when the armature is in a closed position. Fluid flow through the control valve is not blocked when the armature is in an open position. The flow of flux through the first generally radial flux flow path and the flow of flux through the second generally radial flux flow path generates a force urging the armature from the closed position toward the open position when the coil is energized.

Various objects and advantages of this invention will become apparent to those skilled in the art from the following detailed description of the preferred embodiments, when read in light of the accompanying drawings.

BRIEF DESCRIPTION OF THE DRAWINGS

FIG. 4 is an enlarged fragmentary view of the normally open control valve illustrated in FIG. 2, showing the flow of magnetic flux.

FIG. 6 is an enlarged fragmentary view of the normally closed control valve illustrated in FIG. 3, showing the flow of magnetic flux.

DETAILED DESCRIPTION OF THE INVENTION

Figure 1:
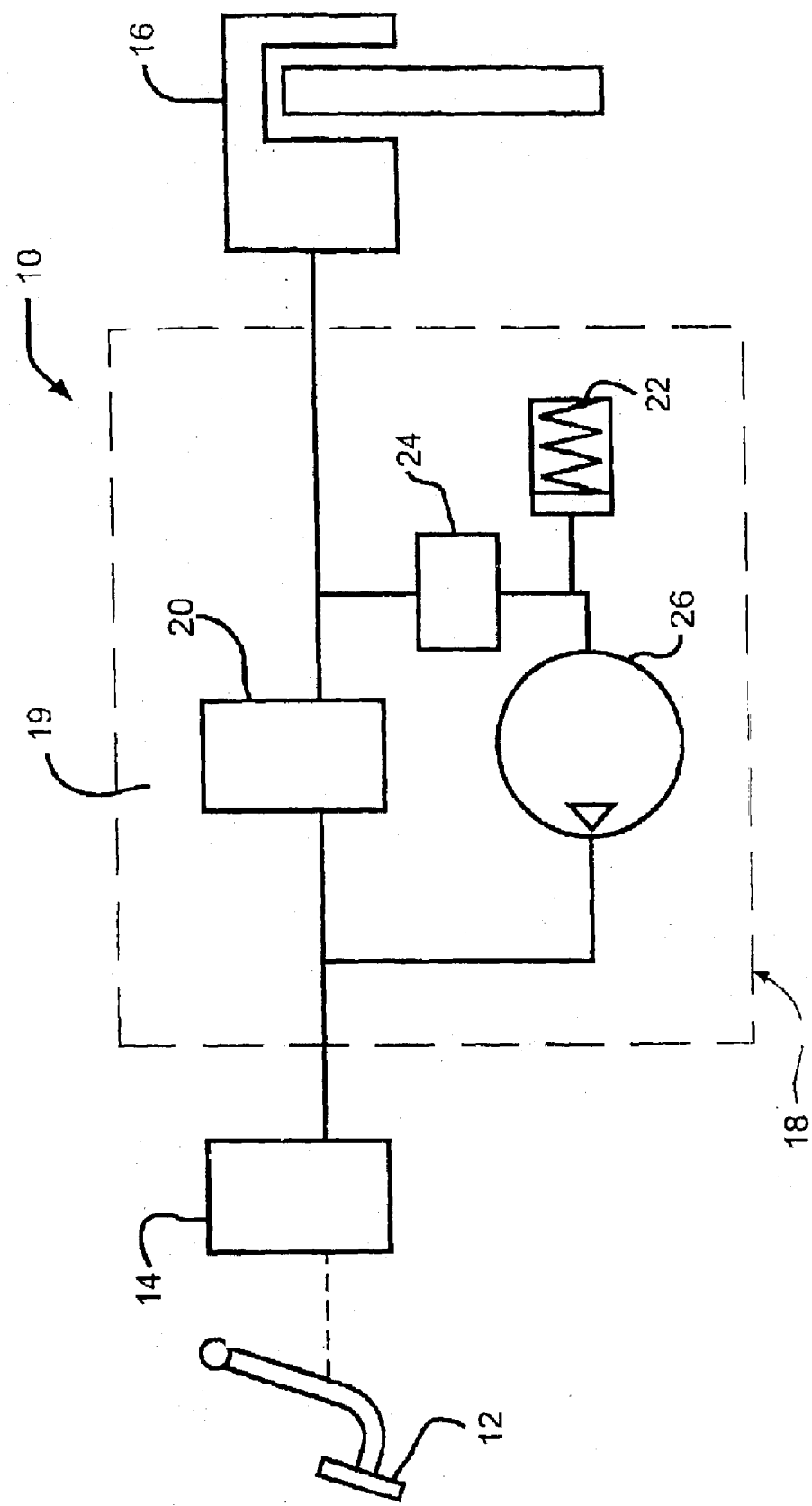
FIG. 1 is a schematic diagram of a vehicular braking system according to the present invention illustrating a hydraulic control unit having a normally open control valve, a normally closed control valve, an accumulator, and a pump.

An exemplary vehicular brake system having a valve according to this invention is indicated generally at 10 in FIG. 1. The brake system 10 includes valves and other components described below to provide an anti-lock braking function. In other embodiments, brake system 10 can also include components to provide traction control and/or vehicle stability control functions. In yet other embodiments, brake system 10 can be formed as an electronic brake management system.

The exemplary brake system 10 includes a brake pedal 12 connected to a master cylinder 14 for providing pressurized brake fluid to a plurality of wheel brakes 16, only one of which is shown. The wheel brake 16 is schematically illustrated as a disc brake. However, the wheel brake 16 may be any type of wheel brake found on vehicles, including a drum brake.

The brake system 10 also includes a hydraulic control unit (HCU) 18 connected in fluid communication between the master cylinder 14 and the wheel brake 16. The HCU 18 includes a housing 19 having bores for receiving control valves and other components described below. Fluid conduits are provided between the bores to provide fluid communication between the valves and other components. For purposes of clarity of illustration, only one set of components is illustrated in FIG. 1. Typically, however, the HCU 18 also houses corresponding components for other brake circuits and/or wheels of the vehicle.

The HCU 18 includes a normally open control valve 20, commonly known as an isolation valve, disposed between the master cylinder 14 and the wheel brake 16, at least one low pressure accumulator 22, a normally closed control valve 24, commonly known as a dump valve, disposed between the wheel brake 16 and the low pressure accumulator 22, and a hydraulic pump 26 having an inlet connected to the low pressure accumulator 22, and a pump discharge connected to the fluid conduit between the master cylinder 14 and the control valve 20. The HCU 18 may also include other fluid flow devices such as an attenuator, restricted orifices, and check valves (none of which are illustrated), depending upon the system design. The control valve 20 is preferably formed as a solenoid valve switchable between two positions. The control valve 24 is also preferably formed as a solenoid valve switchable between an open and a closed position. The valves 20 and 24, as well as the pump 26, are electrically connected to an electronic control module (not illustrated) and operated to provide desired system braking in a well-known manner.

Figure 2:
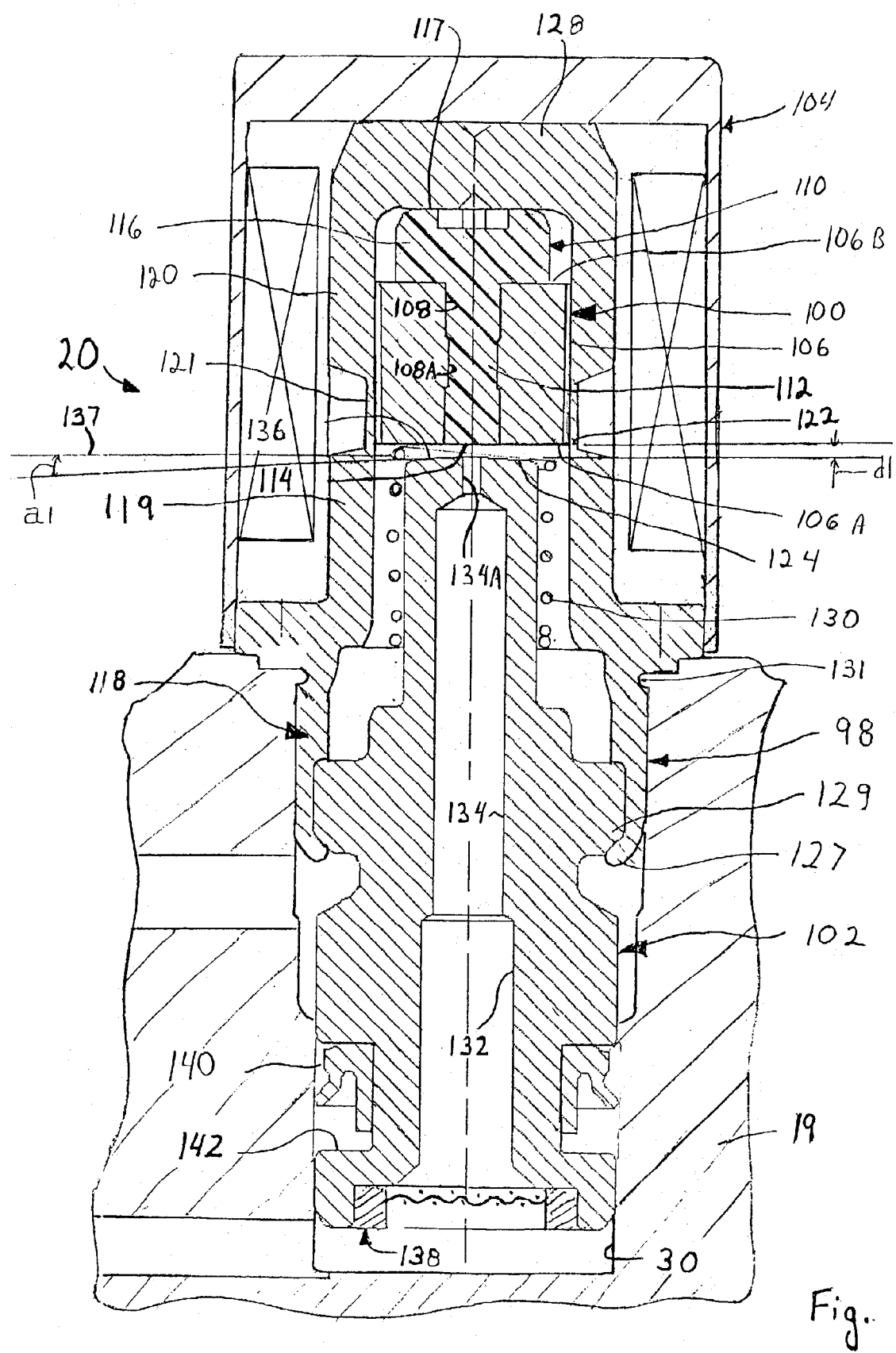
FIG. 2 is a sectional view through the hydraulic control unit of FIG. 1 illustrating the normally open control valve according to the invention.

A sectional view of an embodiment of the normally open control valve 20 is illustrated in FIG. 2. The control valve 20 is received in a bore 30 formed in the housing 19. As described below in detail, the control valve 20 includes a valve body 98 having a first body portion or valve seat 102 and a second body portion or sleeve 118. The control valve 20, being a normally open isolation valve, further includes an armature 100 biased away from a valve seat 102 when the control valve 20 is not energized. A coil assembly 104 is disposed about the sleeve 118. When the coil assembly 104 is energized to produce an electromagnetic field, the armature 100 is pulled toward the valve seat 102 to prevent fluid flow through the valve 20.

The armature 100 is preferably formed as a subassembly and then assembled with the remainder of the valve 20. The armature 100 includes an armature body 106 formed as a hollow cylinder from a ferromagnetic material. The armature body 106 includes a first end 106A and a second end 106B. Preferably, each end 106A and 106B of the armature body 106 is a planar surface. The armature body 106 includes a longitudinal (preferably axial) passage 108. The longitudinal passage 108 can be formed as a bore. Preferably, the longitudinal passage 108 is formed with a centrally disposed reduced diameter portion 108A. The longitudinal passage 108 can also be formed with a constant diameter, or any desired combination of diameters.

The armature 100 also includes an armature core 110. Preferably, the armature core 110 is formed from a molded material such as polyphenylene sulfide (PPS), polypthalamide (PPA), or polyetheretherketone (PEEK). If desired, the armature body 106 can be placed in a mold (not shown). Then the desired material can be injected into the mold to form the armature core 110. The armature core 110 includes a central section 112 disposed in the longitudinal passage 108 of the armature body 106. A first end section 114 and a second end section 116 are formed at opposite ends of the central section 112. Preferably, the second end section 116 extends beyond the second end surface 106B a predetermined distance. The first end section 114 is preferably coplanar with, and preferably does not extend beyond, the first end surface 106A. The second end section 116 can have an outer diameter less than an outer diameter of the armature body 106, and greater than an outer diameter of the central section 112. The second end section 116 preferably terminates in a generally planar end surface 117. The formation and structure of the armature 100, can be described as an armature body 106 having an overmolded armature core 110.

The armature 100 is slidably received in a flux tube or sleeve 118 having a closed end 128. The sleeve 118 includes a first ferromagnetic portion 119 adjacent the valve seat 102, a second ferromagnetic portion 120, and a circumferentially extending groove defining an annular region 121 therebetween. The annular region 121 provides an area of increased magnetic reluctance between the first ferromagnetic portion 119 and the second ferromagnetic portion 120 of the sleeve 118.

As shown in FIGS. 2 and 4, part of the first ferromagnetic portion 119 adjacent the annular region 121 defines a radial magnetic pole 122 for the generally radial transmission of magnetic flux from the armature 100 to the sleeve 118 through a first generally radial flux flow path. The radial magnetic pole 122 is defined as the gap between an inside diameter of the sleeve 118 and an outside diameter of the armature 100. A representative line of flux 144 is depicted in FIG. 4 as taking this generally radial flux flow path.

As best shown in FIG. 4, a portion of the valve seat 102 adjacent the first end section 114 of the armature 100 defines an axial magnetic pole 124 for the generally axial transmission of magnetic flux from the first end section 114 of the armature 100 to the valve seat 102 through a generally axial flux flow path. As used herein, a magnetic pole is defined as a region wherein magnetic flux enters and/or leaves a body.

The armature 100 is disposed at an extreme of travel away from the valve seat 102 when the coil assembly 104 is deenergized such that the control valve 20 is in an open position, as shown in FIG. 2. A spring 130 engages the armature 100 to urge the armature 100 away from the valve seat 102 when the control valve 20 is in the open position. When the coil assembly 104 is energized, the armature 100 is disposed at an extreme of travel toward the valve seat 102, such that the control valve 20 is in a closed position.

When the control valve 20 is in the closed position, fluid flow through the control valve 20 is blocked. When the control valve 20 is in the open position, fluid flow through the control valve 20 is not blocked. When the coil assembly 104 is energized, flux flow, as illustrated by a line 144 in FIG. 4, through the first generally radial flux flow path at the radial magnetic pole 122, and flux flow, as illustrated by line a 145 in FIG. 4, through the generally axial flux flow path at the axial magnetic pole 124, generate a force urging the armature 100 from the open position toward the closed position.

An annular portion 127 adjacent an open end of the sleeve 118 is crimped onto a radially outwardly extending flange 129 formed on the valve seat 102. Preferably, the sleeve 118 is retained within the bore 30 by clinching, wherein material of the housing 19 is forced into a groove 131 formed in the outer surface of the sleeve 118, as shown in FIG. 2. The combined sleeve 118 and the valve seat 102 can be retained in the bore 30 by any desired mechanical or chemical means operative to retain the sleeve 118 within the bore 30, such as a threaded engagement.

The valve seat 102 includes a longitudinal (preferably axial) fluid passage 132 that terminates in a reduced diameter bore 134 extending to an opening 134A. A seat 136 is formed on an outer surface of the valve seat 102. Preferably, the seat 136 has an angle a1 within the range of from about three degrees to about five degrees, as measured from a plane 137 perpendicular to an axis of the bore 134. More preferably, the seat 136 has an angle a1 of about four degrees. The first end surface 106A of the armature 100 acts as a valve sealing element and engages the seat 136 when the armature 100 moves downwardly. When the surface 106A engages the seat 136, the fluid passage 132 and opening 134 is blocked. When the coil assembly 104 is not energized, the first end surface 106A is spaced a distance d1 from the seat 136. At this position, the planar end surface 117 of the second end section 116 engages an inner surface of the closed end 128. Preferably, the valve seat 102 is formed from a ferromagnetic material such as steel, however steel is not required. The valve seat 102 can also be formed from any desired ferromagnetic material.

A filter assembly 138 can be provided adjacent an inlet of the fluid passage 132, although such is not required. A lip seal 140 can be provided in a groove 142 formed in an outer surface of the valve seat 102. Any other desired type of fluid sealing means can also be used.

The armature 100 provides a responsive, economical element that reciprocates in the sleeve 118 during operation of the control valve 20 to provide desired braking responses in the brake system 10.

Figure 5:
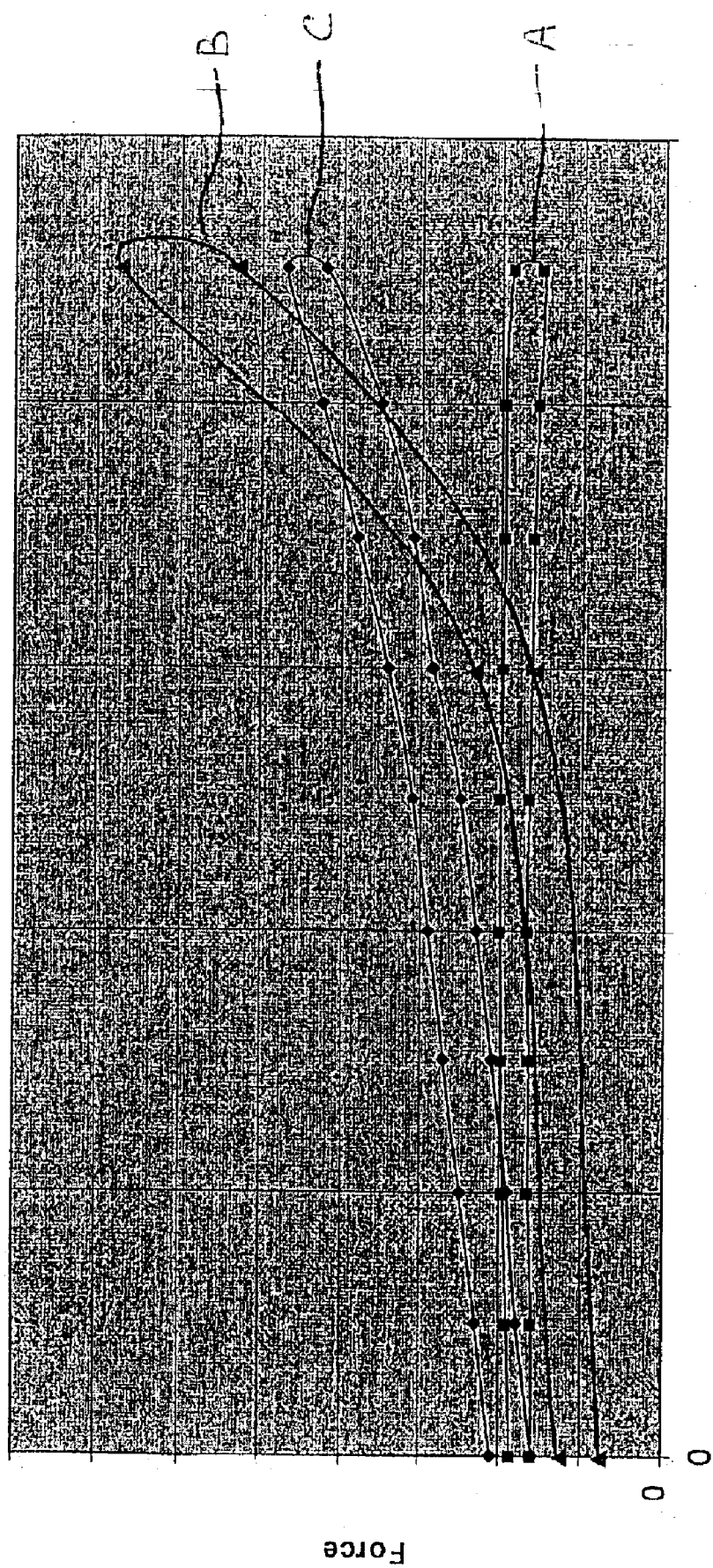
FIG. 5 is a graph of force versus armature travel for the normally open control valve illustrated in FIG. 2.

When the coil assembly 104 is energized, the radial magnetic pole 122 generates a force represented by a generally flat curve of force vs. armature travel, as shown by line A in FIG. 5. Additionally, when the coil assembly 104 is energized, the axial magnetic pole 124 generates a force represented by a generally non-linear curve of force vs. armature travel, as shown by line B in FIG. 5.

Advantageously, the combination of the radial magnetic pole 122 and the axial magnetic pole 124, as illustrated in FIGS. 2 and 4, provides an improved valve performance. The improved valve performance is represented by a generally straight-line curve of force vs. armature travel, as shown by line C in FIG. 5. The combination of the radial magnetic pole 122 and the axial magnetic pole 124 further ensures a relatively quick opening of the control valve 20, and maintains a maximum armature force in the closed position.

Figure 3:
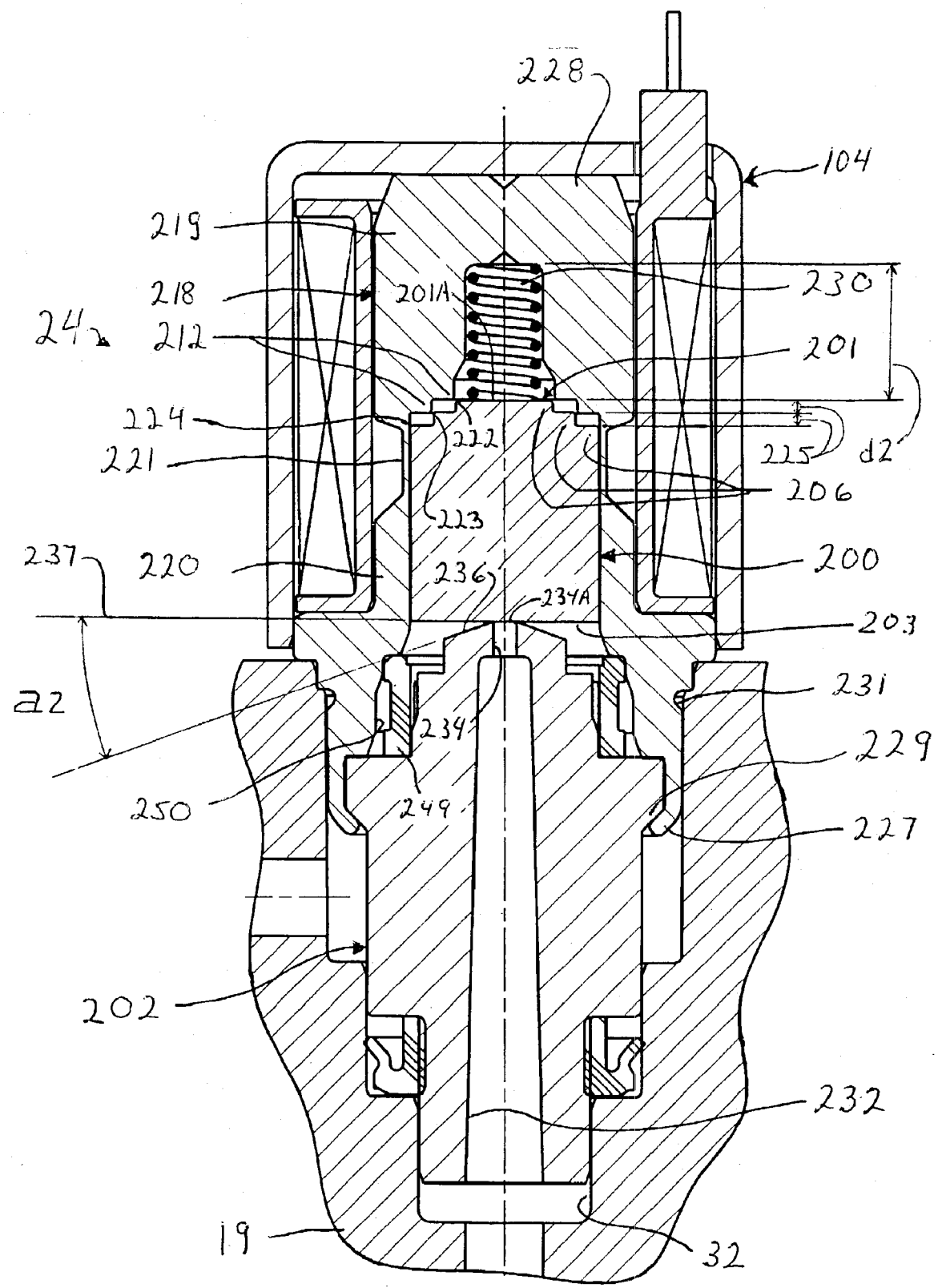
FIG. 3 is a sectional view through the hydraulic control unit of FIG. 1 illustrating the normally closed control valve according to the invention.

A sectional view of an embodiment of the normally closed control valve 24 is illustrated in FIG. 3. The control valve 24 is received in a bore 32 formed in the housing 19. Preferably, the control valve 24 includes many components identical to the control valve 20 shown in FIG. 2, including the coil assembly 104. As described below in detail, the control valve 24, being a normally closed valve, includes an armature 200 biased toward a valve seat 202 when the control valve 24 is not energized. When the coil assembly 104 is energized to produce an electromagnetic field, the armature 200 is pulled away from the valve seat 202 to allow fluid flow through the control valve 24.

Preferably, the armature 200 is formed from a ferromagnetic material. Steel is a preferred material for the armature 200. The armature 200 can also be formed from other desired materials, such as an armature having a ferromagnetic armature core and an overmolded armature body as described regarding the armature 100. The armature 200 includes a first end 201 and a second end 203. Preferably, the second end 203 is a generally planar surface. The first end 201 includes a plurality of steps 206 formed therein and a centrally disposed planar surface 201A. It will be appreciated that any desired number of steps 206 can be formed in the armature 200.

The armature 200 is slidably received in a flux tube or sleeve 218 having a closed end 228. The sleeve 218 includes a first ferromagnetic portion 219, a second ferromagnetic portion 220 adjacent the valve seat 202, and an annular region 221 therebetween. The annular region 221 defines an area of increased magnetic reluctance between the first ferromagnetic portion 219 and the second ferromagnetic portion 220 of the sleeve 218. Preferably, an inner surface of the sleeve 218 includes a plurality of steps 212 formed thereon. The steps 212 cooperate with the steps 206 of the armature 200, as shown in FIG. 3. It will be appreciated that any desired number of steps 212 can be formed in the sleeve 218.

As shown in FIGS. 3 and 6, the cooperating steps 206 of the armature 200 and the steps 212 of the sleeve 218 define radial magnetic gaps or poles 222, 223, and 224 for the generally radial transmission of magnetic flux from each of the steps 206 of the armature 200 to the respective associated steps 212 of the sleeve 218. The steps 206 further cooperate with the steps 212 to define a plurality of axial magnetic gaps or poles 225 for the generally axial transmission of magnetic from the steps 206 to the respective associated steps 212.

The radial magnetic poles 222, 223, and 224 are defined as the gaps between an inside diameter of the sleeve 218, as defined by the steps 212, and an outside diameter of the armature 200, as defined by the steps 206. The axial magnetic poles 225 are defined as the axial gaps 225 (vertical as viewed in FIG. 6) between the steps 206 and the steps 212.

The armature 200 is disposed at an extreme of travel toward the valve seat 202 when the coil assembly 104 is deenergized such that the control valve 24 is in a closed position, as shown in FIG. 3. A spring 230 engages the armature 200 to urge the armature 200 toward the valve seat 202 when the control valve 24 is in the closed position. When the coil assembly 104 is energized, the armature 200 is disposed at an extreme of travel away from the valve seat 202, such that the control valve 24 is in an open position.

When the control valve 24 is in the closed position, fluid flow through the control valve 24 is blocked. When the control valve 24 is in the open position, fluid flow through the control valve 24 is not blocked. When the coil assembly 104 is energized, flux flow, as illustrated by lines 244, 245, and 246 in FIG. 6, through the generally radial flux flow paths at the radial magnetic poles 222, 223, and 224, generate a force urging the armature 200 from the closed position toward the open position.

An annular portion 227 adjacent an open end of the sleeve 218 is crimped onto a radially outwardly extending flange 229 formed on the valve seat 202. Preferably, the sleeve 218 is retained within the bore 30 by clinching, wherein material of the housing 19 is forced into a groove 231 formed in the outer surface of the sleeve 218, as shown in FIG. 2. The combined sleeve 218 and the valve seat 202 can be retained in the bore 30 by any desired mechanical or chemical means operative to retain the sleeve 218 within the bore 30, such as a threaded engagement.

The valve seat 202 includes a longitudinal (preferably axial) fluid passage 232 that terminates in a reduced diameter bore 234 extending to an opening 234A. A seat 236 is formed on an outer surface of the valve seat 202. Preferably, the seat 236 has an angle a2 within the range of from about 19 degrees to about 21 degrees, as measured from a plane 237 perpendicular to an axis of the bore 234. More preferably, the seat 236 has an angle a2 of about 20 degrees. The valve seat 202 can be formed from any desired material. Preferably, the armature core 110 is formed from a molded material such as polyphenylene sulfide (PPS), polypthalamide (PPA), or polyetheretherketone (PEEK).

The second end surface 203 of the armature 200 acts as a valve sealing element and engages the seat 236 when the armature 200 is in a closed position; e.g. when the coil assembly 104 is not energized. When the surface 203 engages the seat 236, the fluid passage 232 and opening 234 is blocked. When the coil assembly 104 is energized, the armature 200 is pulled away from the valve seat 202 so that fluid can flow through the fluid passage 232 and the opening 234 in the valve seat 202. When the coil assembly 104 is not energized, planar end surface 201A of the armature 200 is spaced a predetermined distance d2 from an inner surface of the closed end 228.

An internal band filter 249 can be placed between the sleeve 218 and the valve seat 202, although such is not required. Preferably, the band filter is received in a pocket 250 formed between the sleeve 218 and the valve seat 202.

The armature 200 provides a responsive, economical element that reciprocates in the sleeve 218 during operation of the control valve 24 to provide desired braking responses in the brake system 10.

Figure 7:
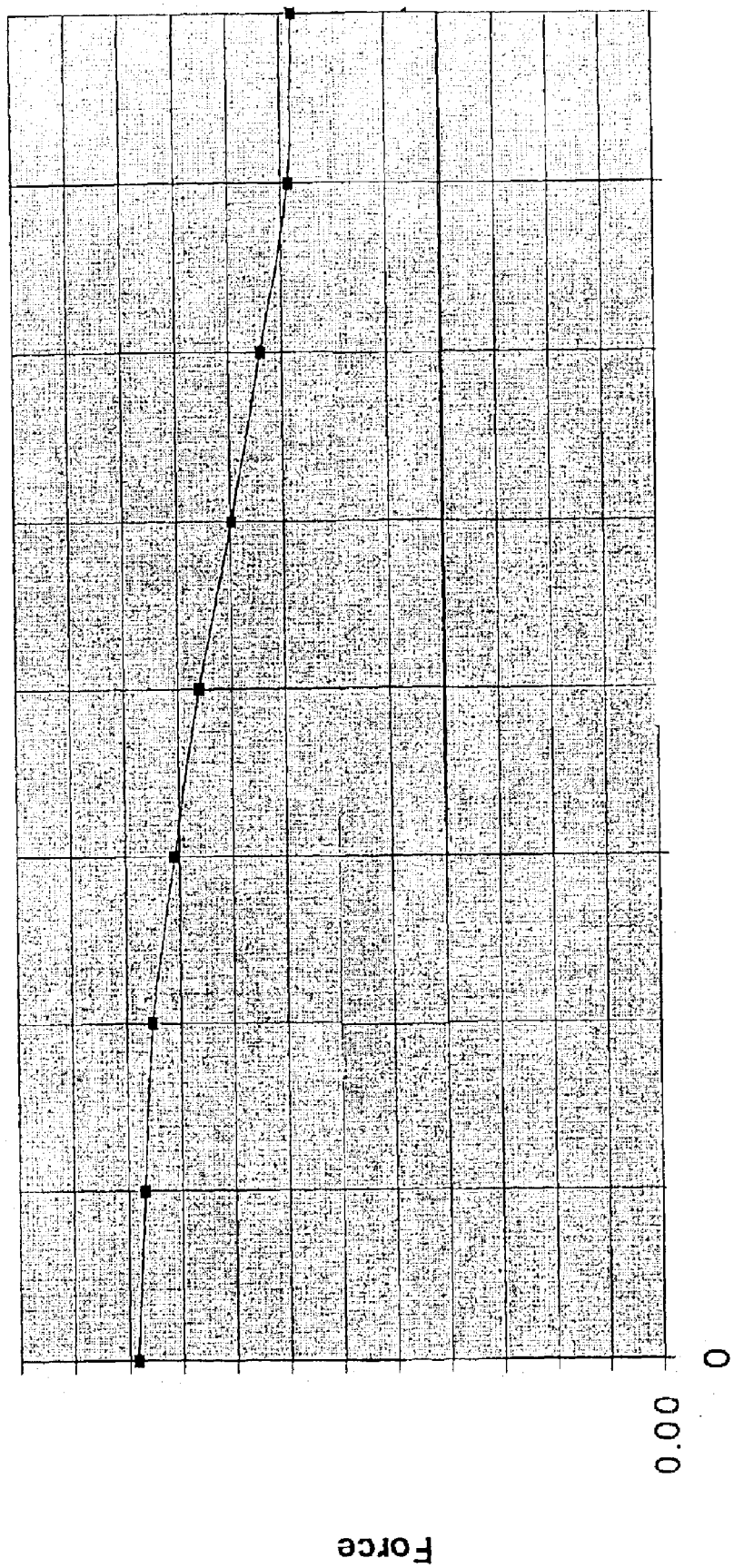
FIG. 7 is a graph of force versus armature travel for the normally closed control valve illustrated in FIG. 3.

The radial magnetic poles 222, 223, and 224, as illustrated in FIGS. 3 and 6, provide an improved valve performance. The improved valve performance is represented by a non-linear curve of force vs. armature travel, as shown by line D in FIG. 7. Preferably, the control valve 24 generates a greater force in the closed position relative to the open position. The combination of the radial magnetic poles 222, 223, and 224 further ensures a relatively quick opening of the control valve 24, and requires a relatively small spring force to move the armature 200 from the open position to the closed position.

Figure 8:
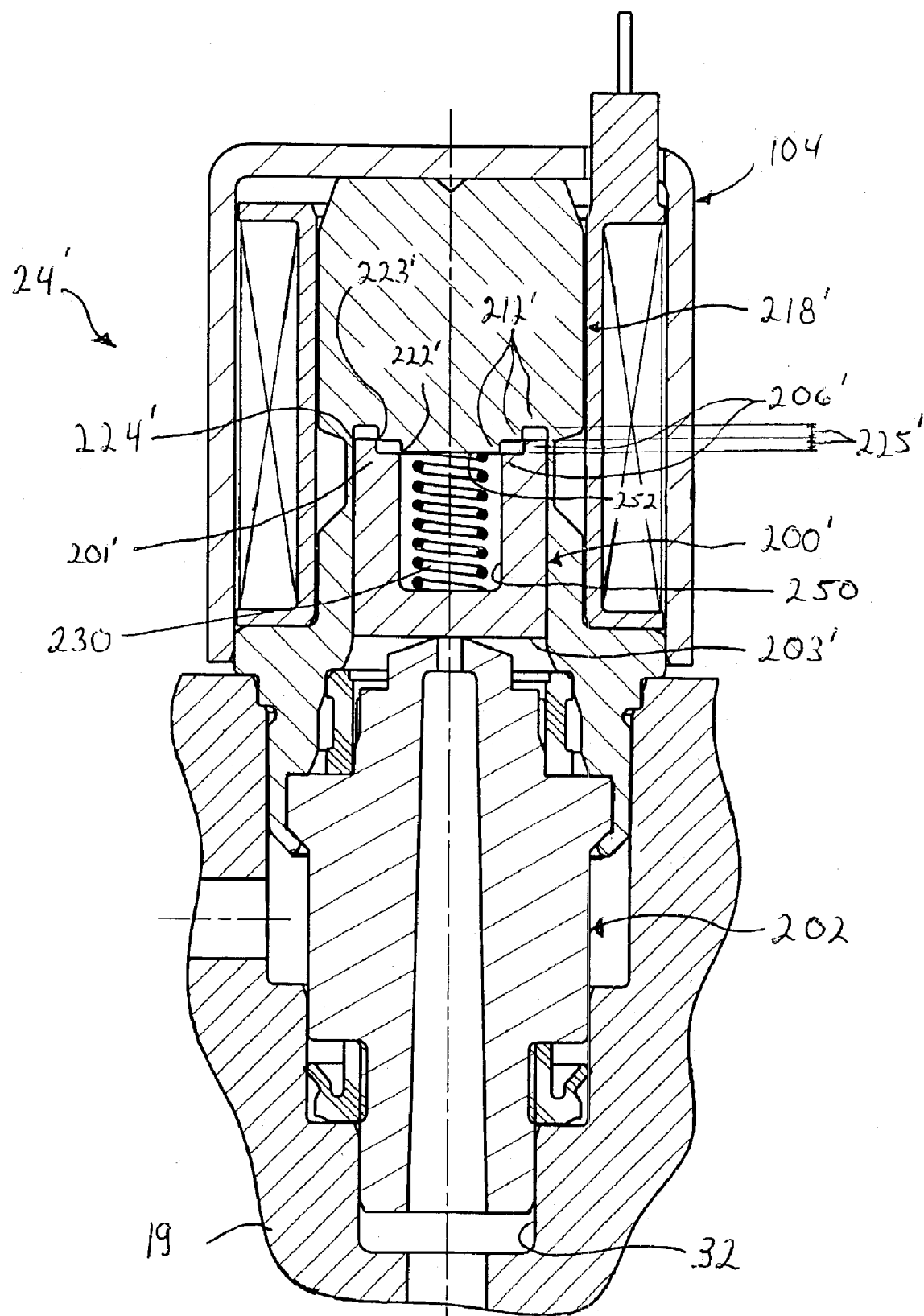
FIG. 8 is a partial sectional view of an alternate embodiment of the normally closed control valve illustrated in FIG. 3, showing the sleeve and the armature.

FIG. 8 depicts generally at 24', a partial sectional view of an alternate embodiment of the normally closed control valve 24 discussed above. The control valve 24' is substantially identical to the control valve 24, except for the configuration of an armature 200' and a sleeve 218'.

The armature 200' includes a first end 201' and a second end 203'. Preferably, the second end 203' is a generally planar surface. The first end 201' includes a recess 250 having a plurality of steps 206' formed therein. Although two steps are illustrated in the exemplary embodiment, any desired number of steps can be formed in the armature 200'.

An inner end surface 252 of the sleeve 218' includes a plurality of steps 212' formed thereon. Preferably, the steps 206' of the recess 250 have a shape generally complementary to the shape of the steps 212' of the sleeve 218' such that the steps 212' of the sleeve 218' are received within the steps 206' of the armature 200' when the control valve 24' is in an open position. It will be appreciated that any desired number of steps 206' and 212' can be formed in the armature 200' and the sleeve 218', respectively. As described in reference to FIG. 3, the steps 212' of the sleeve 218' cooperate with the steps 206' of the armature 200' to define radial magnetic poles 222', 223', and 224' for the generally radial transmission of magnetic from the steps 212' to the respective associated steps 206'. The steps 212' further cooperate with the steps 206' to define a plurality of axial magnetic poles 225 for the generally axial transmission of magnetic from the steps 212' to the respective associated steps 206'.

One end of the spring 230 is disposed against the surface 252. The other end of the spring 230 engages the armature 200' within the recess 250. The spring 230 engages the armature 200' to urge the armature 200' toward the valve seat 202 when the control valve 24' is in the closed position.

Figure 9:
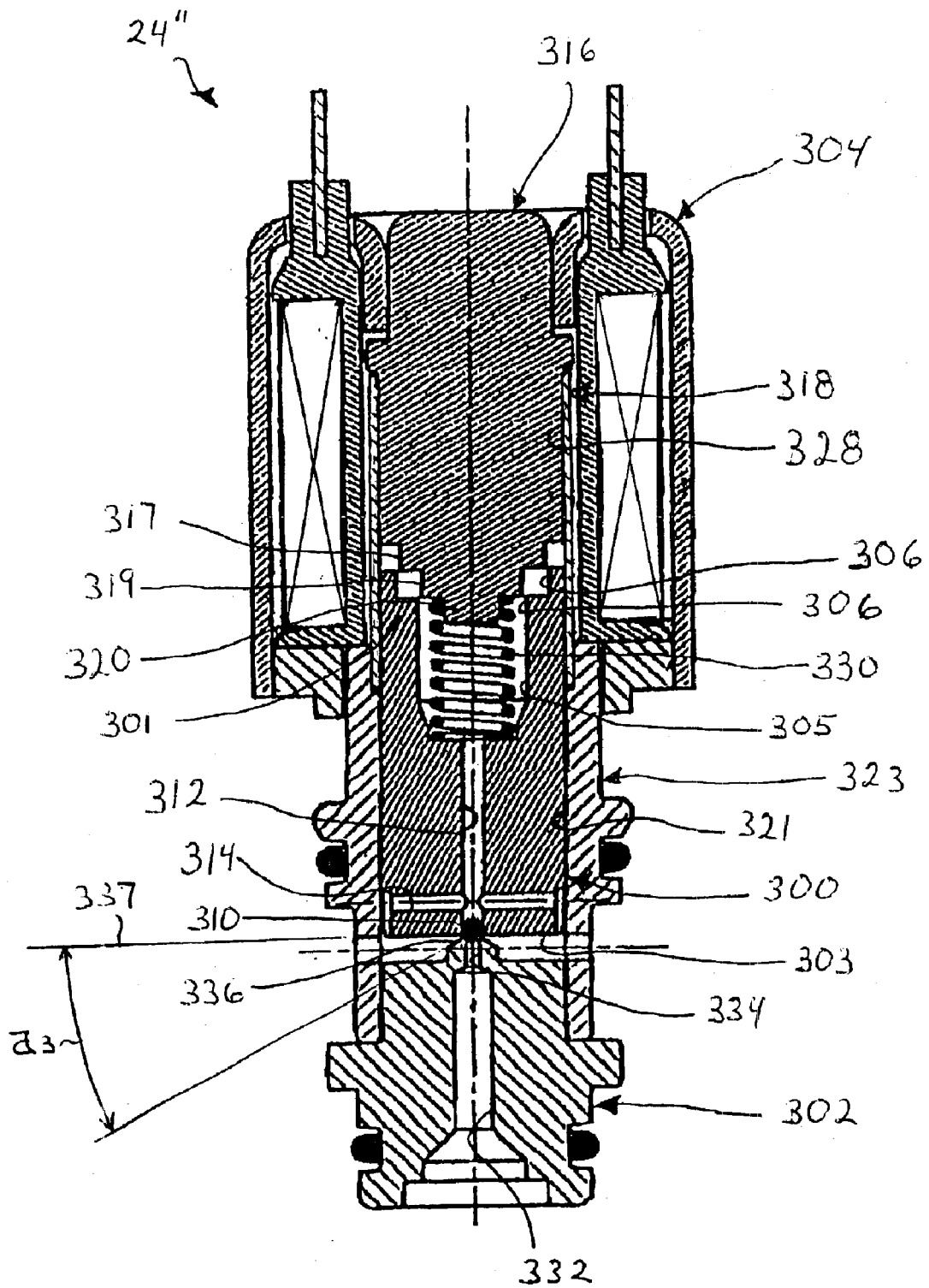
FIG. 9 is a sectional view of an alternate embodiment of the normally closed control valve according to the invention.

A sectional view of another alternate embodiment of the normally closed control valve is illustrated at 24" in FIG. 9. Preferably, the control valve 24" includes a coil assembly 304. As described below in detail, the control valve 24", being a normally closed control valve, includes an armature 300 biased toward a valve seat 302 when the control valve 24" is not energized. When the coil assembly 304 is energized to produce an electromagnetic field, the armature 300 is pulled away from the valve seat 302 to allow fluid flow through the control valve 24".

Preferably, the armature 300 is formed entirely from a ferromagnetic material. Steel is a preferred material for the armature 300. The armature 300 can also be formed from other desired materials, such as an armature having a ferromagnetic armature core and an overmolded non-ferromagnetic armature body in a manner similar to the armature 100 described above, or any other suitable arrangement for an electromagnetically operated armature.

The armature 300 includes a first end 301 and a second end 303. Preferably, the second end 303 is a generally planar surface. The first end 301 includes a recess 305 having a plurality of steps 306 formed therein. It will be appreciated that any desired number of steps 306 can be formed in the armature 300. A hardened ball 310 is fixed in an axial bore 312 centrally formed in the armature 300. The ball 310 protrudes slightly from the second end 303 of the armature 300. The axial bore 312 is in fluid communication with the recess 305. A transverse bore 314 is formed at the second end 303 of the armature 300 and is in fluid communication with the axial bore 312.

A magnetic pole cap or member 316 includes a plurality of steps 317 formed at one end thereof. Preferably, the pole member 316 also includes a centrally formed and generally cylindrical protrusion 320. One end of a spring 330 is disposed about the protrusion 320. The other end of the spring 330 engages the armature 300 within the recess 305. Preferably, the steps of the recess 305 have a shape complementary to the shape of the steps 317 of the pole member 316 such that the steps 317 of the pole member 316 are received within the steps 306 of the recess 305 when the control valve 24" is in an open position. It will be appreciated that any desired number of steps 317 can be formed in the pole member 316.

A generally cylindrical adapter 323 includes an adapter bore 321. The adapter 323 is preferably formed from a ferromagnetic material. Steel is a preferred material for the adapter 323.

Preferably, the valve seat 302 is disposed within the adapter bore 321 at one end of the adapter 323. More preferably, the valve seat 302 is pushed into the adapter bore 321, and attached to the adapter 323 by any desired method, such as a press fit. The valve seat 302 can be formed from any desired material. Preferably, the valve seat 302 is formed from a molded material such as polyphenylene sulfide (PPS), polypthalamide (PPA), or polyetheretherketone (PEEK).

One end of a flux tube or sleeve 318 is disposed within the adapter bore 321 at the other end of the adapter 323. The other end of the sleeve 318 is disposed about the pole member 316. Preferably, the sleeve 302 is attached to the pole member 316 and the adapter 323 by any desired method, such as a press fit or by welding. Preferably, a sleeve bore 328 of the sleeve 318 has an inner diameter equal to the inner diameter of the adapter bore 321. The armature 300 and the pole member 316 are slidably received within the adapter bore 321 and the bore 328 of the sleeve 318. Preferably, the armature 300 and the pole member 316 are dropped into the sleeve bore 328 and the adapter bore 321 during assembly of the valve 24". However, if desired, the pole member 316, the sleeve 318 and the adapter 323 can be formed as a single piece.

The sleeve 318 is preferably formed of a non-ferromagnetic material, such as stainless steel, although any desired non-ferromagnetic material can be used. Alternately, the sleeve 318 can be formed such that it includes a first ferromagnetic portion, a second ferromagnetic portion adjacent the adapter 323, and central non-ferromagnetic portion therebetween. The central portion defines an area of increased magnetic reluctance between the first ferromagnetic portion and the second ferromagnetic portion of the sleeve 318.

Figure 10:
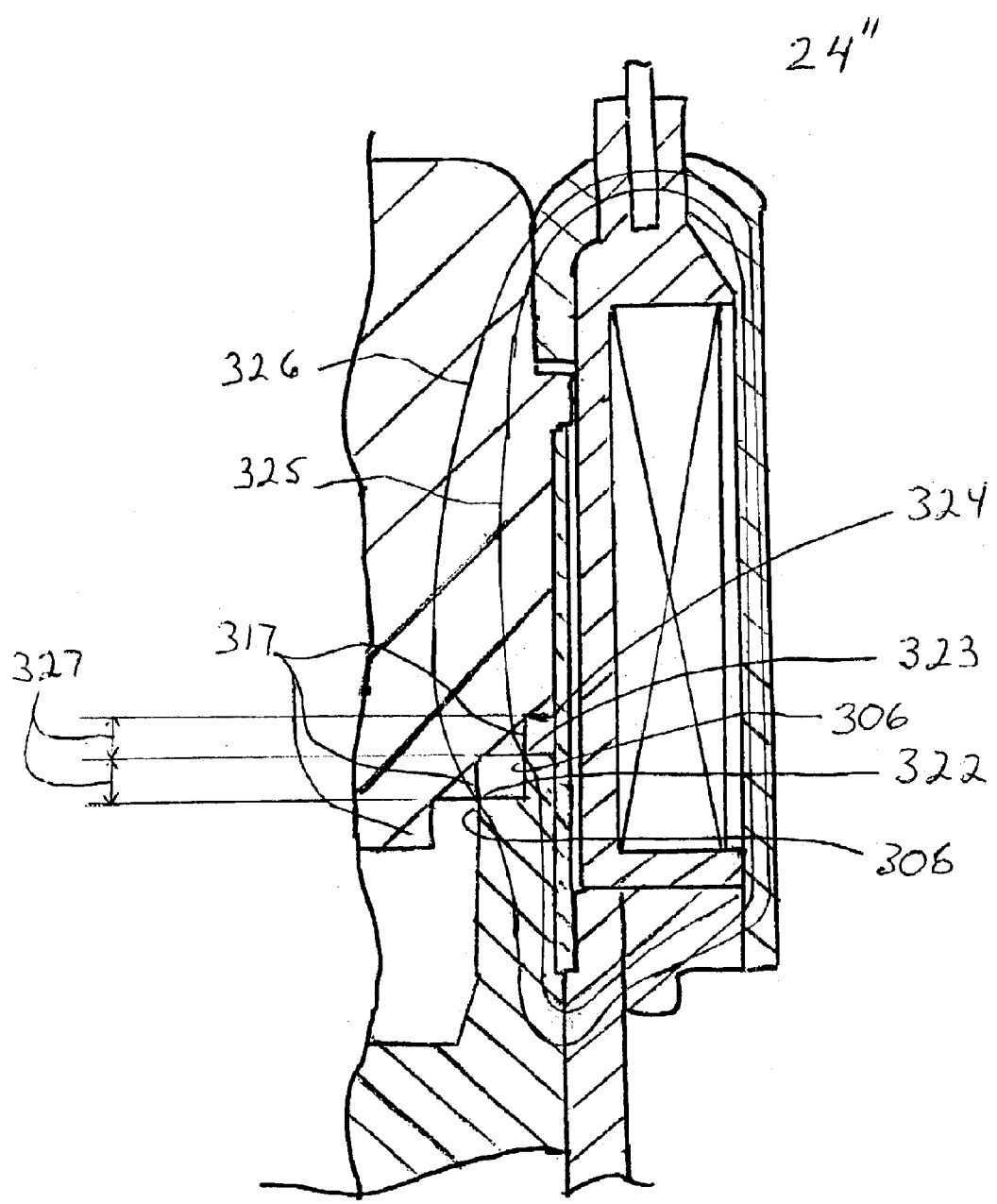
FIG. 10 is an enlarged fragmentary view of the normally closed control valve illustrated in FIG. 9, showing the flow of magnetic flux.

As shown in FIG. 10 the cooperating steps 306 of the armature 300 and the steps 317 of the pole member 316, respectively define radial magnetic poles 322, 323, and 324 for the generally radial transmission of magnetic flux between each of the steps 306 of the armature 300 and the respective associated steps 317 of the pole member 316. The steps 317 further cooperate with the steps 306 to define a plurality of axial magnetic poles 327 for the generally axial transmission of magnetic from the steps 317 to the respective associated steps 306.

As shown in FIG. 9, the armature 300 is disposed at an extreme of travel toward the valve seat 302 when the coil assembly 304 is deenergized, such that the control valve 24" is in a closed position. The spring 330 engages the armature 300 to urge the armature 300 toward the valve seat 302 when the control valve 24" is in the closed position. When the coil assembly 304 is energized, the armature 300 is disposed at an extreme of travel away from the valve seat 302, such that the control valve 24" is in an open position.

When the control valve 24" is in the closed position, fluid flow through the control valve 24" is blocked. When the control valve 24" is in the open position, fluid flow through the control valve 24" is not blocked. When the coil assembly 304 is energized, flux flow, as illustrated by lines 325 and 326 in FIG. 10, through the generally radial flux flow paths at the radial magnetic poles 322 and 324, generate a force urging the armature 300 from the illustrated closed position toward the open position (not shown).

Referring again to FIG. 9, the valve seat 302 includes a central axial fluid passage 332 that terminates in a reduced diameter bore 334. A seat 336 is formed on an outer surface of the valve seat 302. Preferably, the seat 336 has an angle a3 within the range of from about 20 degrees to about 30 degrees, as measured from a plane 337 perpendicular to an axis of the bore 334. More preferably, the seat 336 has an angle a3 of about 25 degrees.

The ball 310 acts as a valve sealing element and engages the seat 336 when the armature 300 is in a closed position; e.g. when the coil assembly 304 is not energized. When the ball 310 engages the seat 336, the fluid passage 332 and opening 335 is blocked. When the coil assembly 304 is energized, the armature 300 and ball 310 are pulled away from the valve seat 302 so that fluid can flow through the fluid passage 332 and the opening 334 in the valve seat 302.

The armature 300 provides a responsive, economical element that reciprocates in the sleeve 318 during operation of the control valve 24" to provide desired braking responses in the brake system 10.

Figure 11:
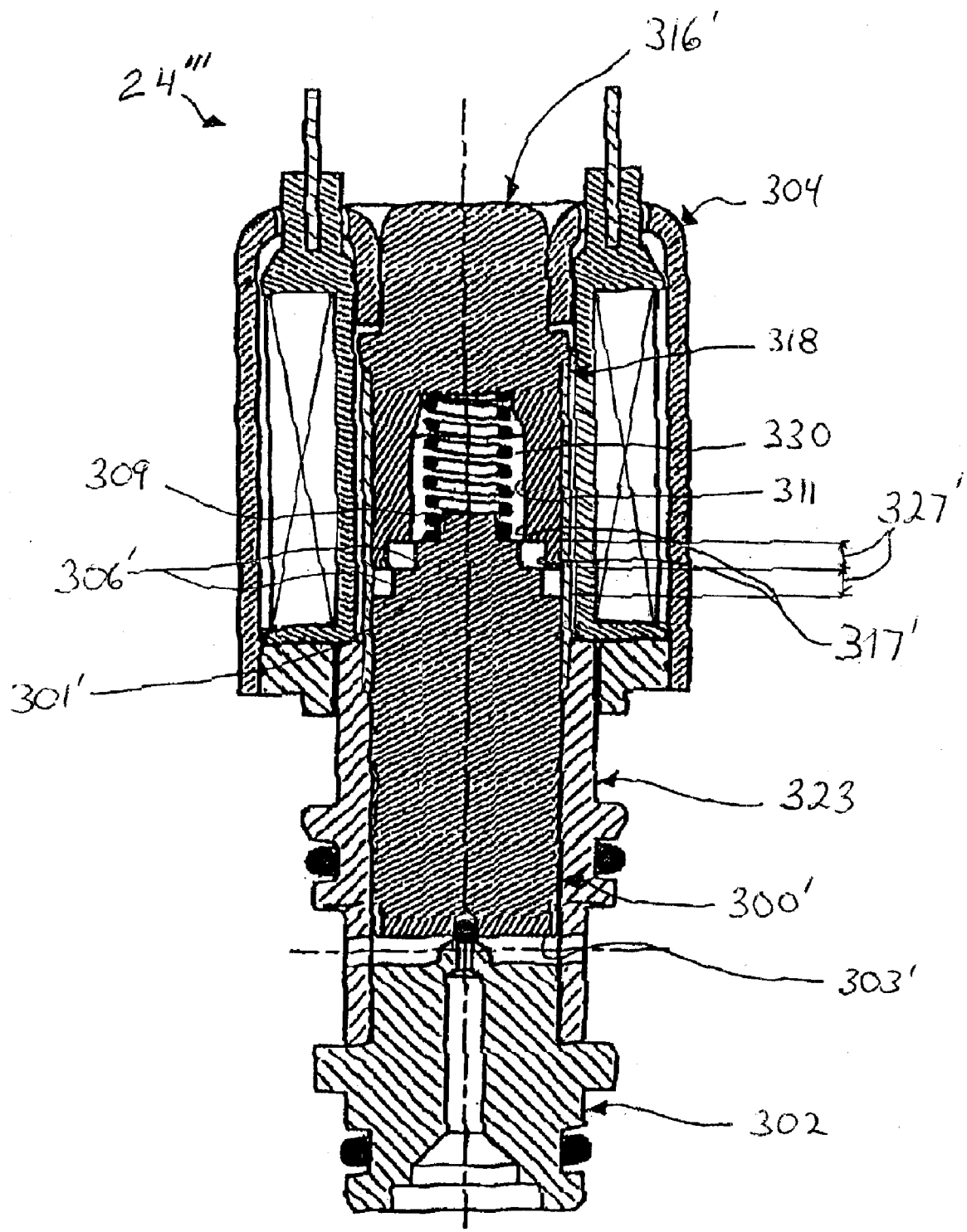
FIG. 11 is a sectional view of an alternate embodiment of the normally closed control valve illustrated in FIG. 9.

FIG. 11 illustrates generally at 24'", a sectional view of an alternate embodiment of the normally closed control valve 24 having an exemplary alternate configuration of a pole member and an armature. The control valve 24'" is substantially identical to the control valve 24", except for an armature 300' and a pole member 316'.

The armature 300' includes a first end 301' and a second end 303'. Preferably, the second end 303' is a generally planar surface. The first end 301' includes a plurality of steps 306', and a centrally formed and generally cylindrical protrusion 309 formed thereon. It will be appreciated that any desired number of steps 306' can be formed in the armature 300'.

The pole member 316' includes s a recess 311 having a plurality of steps 317' formed therein. Preferably, the steps 317' of the recess 311 have a shape complementary to the shape of the steps 306' of the armature 300' such that the steps 306' of the armature 300' are received within the steps 317' of the pole member 316' when the control valve 24''' is in an open position. It will be appreciated that any desired number of steps 317' can be formed in the pole member 316'. The steps 306' of the armature 300' cooperate with the steps 317' of the pole member 316' to define radial magnetic poles 322', 323', and 324' for the generally radial transmission of magnetic from the steps 317' to the respective associated steps 306'. The steps 306' further cooperate with the steps 317' to define a plurality of axial magnetic poles 327' for the generally axial transmission of magnetic from the steps 317' to the respective associated steps 306'.

One end of the spring 330 is disposed about the protrusion 309. The other end of the spring 330 engages the pole member 316' within the recess 311. The spring 330 engages the armature 300' to urge the armature 300' toward the valve seat 302 when the control valve 24''' is in the closed position.

In accordance with the provisions of the patent statutes, the principle and mode of operation of this invention have been explained and illustrated in its preferred embodiments. However, it must be understood that this invention may be practiced otherwise than as specifically explained and illustrated without departing from its spirit or scope.

What is claimed is:

1. A control valve for controlling fluid flow in a hydraulic control unit, said control valve comprising:

a valve body, said valve body comprising a first body portion and a second body portion adjacent said first body portion, said second body portion having a bore formed therein, wherein said first body portion comprises a valve seat, and said second body portion comprises a sleeve mounted on said valve seat, said sleeve having a first ferromagnetic portion adjacent said valve seat, a second ferromagnetic portion, and an annular region defining an area of increased magnetic reluctance between said first ferromagnetic portion and said second ferromagnetic portion of said sleeve, a stepped portion being formed on an inner surface of said sleeve;

an armature slidably received in said bore of said second body portion, said armature comprising a first end, said first end of said armature providing a first generally radial flux flow path and at least one of a second generally radial flux flow path and a generally axial flux flow path, said first end of said armature comprising a stepped portion formed on an outer surface of said first end, said stepped portion of said first end of said armature being complementary to said stepped portion formed on said inner surface of said sleeve and comprising at least two steps, said stepped portion of said sleeve being adapted to receive said stepped portion of said armature, at least two steps of said stepped portion of said armature forming radial magnetic poles for the generally radial transmission of magnetic flux from each of said steps of said first end of said armature to respective associated steps of said stepped portion of said sleeve; and an electrical coil disposed about said valve body for selectively inducing a magnetic flux in said armature.

2. The control valve according to claim 1, said first end of said armature being adjacent said valve seat.

3. The control valve according to claim 1, wherein at least part of said first portion adjacent said region of increased magnetic reluctance, said part of said first portion defining a radial magnetic pole for the generally radial transmission of magnetic flux along the first generally radial flow path from said armature to said sleeve, said armature comprising a body slidably received in said sleeve, at least a portion of said valve seat adjacent said first end of said armature defining an axial magnetic pole for the generally axial transmission of magnetic flux along the generally axial flow path from said first end of said armature to said valve seat.

4. The control valve according to claim 3, wherein said annular region of increased magnetic reluctance comprises a portion of said sleeve in which a circumferentially extending groove is defined.

5. The control valve according to claim 2, wherein said armature further comprises a second end axially opposite to said first end, said second end being formed of non-ferromagnetic material.

6. The control valve according to claim 1, said armature being disposed at an extreme of travel away from said valve seat when said coil is deenergized such that said control valve is in an open position, said armature being disposed at an extreme of travel toward said valve seat when said coil is energized, such that said control valve is in a closed position.

7. The control valve according to claim 1, including a spring engaging said armature to urge said armature away from said valve seat when said control valve is in an open position.

8. The control valve according to claim 1, wherein said armature cooperating with said valve seat to block fluid flow through said control valve when said armature is in a closed position, fluid flow through said control valve not being blocked when said armature is in an open position, the flux flow through said first generally radial flux flow path and the flux flow through said generally axial flux flow path generating a force urging said armature from said open position toward said closed position when said coil is energized.

9. The control valve according to claim 1, said first end of said armature being axially opposite said valve seat.

10. The control valve according to claim 1, wherein said annular region of increased magnetic reluctance comprises a portion of said sleeve in which a circumferentially extending groove is defined.

11. The control valve according to claim 1, said armature being disposed at an extreme of travel toward said first body portion when said coil is deenergized such that said control valve is in a closed position, said armature being disposed at an extreme of travel away from said valve seat when said coil is energized, such that said control valve is in an open position.

12. The control valve according to claim 1, including a spring engaging said armature to urge said armature toward said valve seat when said control valve is in a closed position.

13. The control valve according to claim 1, wherein said armature cooperating with said valve seat to block fluid flow through said control valve when said armature is in a closed position, fluid flow through said control valve not being blocked when said armature is in an open position, the flux flow through said first generally radial flux flow path and the flux flow through said second generally radial flux flow path generating a force urging said armature from said closed position toward said open position when said coil is energized.

14. The control valve according to claim 9 wherein said sleeve having a first ferromagnetic portion adjacent said valve seat, a second ferromagnetic portion, and an annular region defining an area of increased magnetic reluctance between said first ferromagnetic portion and said second ferromagnetic portion of said sleeve, a stepped portion being formed on an inner surface of said sleeve, said first end of said armature comprising a recess, a stepped portion being formed on an inner surface of said recess, said stepped portion of said armature being complementary to said stepped portion formed on said inner surface of said sleeve and comprising at least two steps, said stepped portion of said armature being adapted to receive said stepped portion of said sleeve, at least two steps of said stepped portion of said armature forming radial magnetic poles for the generally radial transmission of magnetic flux from each of said steps of said first end of said armature to respective associated steps of said stepped portion of said sleeve.

15. The control valve according to claim 14, wherein said annular region of increased magnetic reluctance comprises a portion of said sleeve in which a circumferentially extending groove is defined.

16. The control valve according to claim 14, said armature being disposed at an extreme of travel toward said valve seat when said coil is deenergized such that said control valve is in a closed position, said armature being disposed at an extreme of travel away from said valve seat when said coil is energized, such that said control valve is in an open position.

17. The control valve according to claim 14, including a spring engaging said armature to urge said armature toward said valve seat when said control valve is in a closed position.

18. The control valve according to claim 14, wherein said armature cooperating with said valve seat to block fluid flow through said control valve when said armature is in a closed position, fluid flow through said control valve not being blocked when said armature is in an open position, the flux flow through said first generally radial flux flow path and the flux flow through said second generally radial flux flow path generating a force urging said armature from said closed position toward said open position when said coil is energized.

19. A control valve for controlling fluid flow in a hydraulic control unit, said control valve comprising:
 a valve body, said valve body comprising a first body portion and a second body portion adjacent said first body portion, said second body portion having a bore formed therein, wherein said first body portion comprises a valve seat, and said second body portion comprises a sleeve mounted on said valve seat, said sleeve having a first ferromagnetic portion adjacent said valve seat, a second ferromagnetic portion, and an annular region defining an area of increased magnetic reluctance between said first ferromagnetic portion and said second ferromagnetic portion of said sleeve, a stepped portion being formed on an inner surface of said sleeve;
 an armature slidably received in said bore of said second body portion, said armature comprising a first end adjacent said first body portion, said first end of said armature providing a plurality of flux flow paths, said plurality of flux flow paths comprising a generally radial flux flow path and a generally axial flux flow path, said first end of said armature comprising a stepped portion formed on an outer surface of said first end, said stepped portion of said first end of said armature being complementary to said stepped portion formed on said inner surface of said sleeve and comprising at least two steps, said stepped portion of said sleeve being adapted to receive said stepped portion of said armature, at least two steps of said stepped portion of said armature forming radial magnetic poles for the generally radial transmission of magnetic flux from each of said steps of first end of said armature to respective associated steps of said stepped portion of said sleeve; and
 an electrical coil disposed about said valve body for selectively inducing a magnetic flux in said armature.

20. The control valve according to claim 19, wherein said sleeve having a first ferromagnetic portion adjacent said valve seat, a second ferromagnetic portion, and an annular region defining an area of increased magnetic reluctance between said first ferromagnetic portion and said second ferromagnetic portion of said sleeve, at least part of said first portion adjacent said region of increased magnetic reluctance, said part of said first portion defining a radial magnetic pole for the generally radial transmission of magnetic flux from said armature to said sleeve, said armature comprising a body slidably received in said sleeve, at least a portion of said valve seat adjacent said first end of said armature defining an axial magnetic pole for the generally axial transmission of magnetic flux from said first end of said armature to said valve seat.

21. The control valve according to claim 20, wherein said annular region of increased magnetic reluctance comprises a portion of said sleeve in which a circumferentially extending groove is defined.

22. The control valve according to claim 19, wherein said armature further comprises a second end axially opposite to said first end, said second end being formed of non-ferromagnetic material.

23. The control valve according to claim 19, said armature being disposed at an extreme of travel away from said valve seat when said coil is deenergized such that said control valve is in an open position, said armature being disposed at an extreme of travel toward said valve seat when said coil is energized, such that said control valve is in a closed position.

24. The control valve according to claim 19, including a spring engaging said armature to urge said armature away from said valve seat when said control valve is in an open position.

25. The control valve according to claim 19, wherein said armature cooperating with said valve seat to block fluid flow through said control valve when said armature is in a closed position, fluid flow through said control valve not being blocked when said armature is in an open position, the flux flow through said first generally radial flux flow path and the flux flow through said generally axial flux flow path generating a force urging said armature from said open position toward said closed position when said coil is energized.

26. A control valve for controlling fluid flow in a hydraulic control unit, said control valve comprising:
 a valve body, said valve body comprising a first body portion and a second body portion adjacent said first body portion, said second body portion having a bore formed therein, wherein said first body portion comprises a valve seat, and said second body portion comprises a sleeve mounted on said valve seat, said sleeve having a first ferromagnetic portion adjacent said valve seat, a second ferromagnetic portion, and an annular region defining an area of increased magnetic reluctance between said first ferromagnetic portion and said second ferromagnetic portion of said sleeve, a stepped portion being formed on an inner surface of said sleeve;
 an armature slidably received in said bore of said second body portion, said armature comprising a first end and a second end adjacent said first body portion, said first end of said armature providing a plurality of generally radial flux flow paths, said first end of said armature comprising a stepped portion formed on an outer surface of said first end, said stepped portion of said first end of said armature being complementary to said stepped portion formed on said inner surface of said sleeve and comprising at least two steps, said stepped portion of said sleeve being adapted to receive said stepped portion of said armature, at least two steps of said stepped portion of said armature forming radial magnetic poles for the generally radial transmission of magnetic flux from each of said steps of said first end of said armature to respective associated steps of said stepped portion of said sleeve; and an electrical coil disposed about said valve body for selectively inducing a magnetic flux in said armature.

27. The control valve according to claim 19, wherein said annular region of increased magnetic reluctance comprises a portion of said sleeve in which a circumferentially extending groove is defined.

28. The control valve according to claim 26, said armature being disposed at an extreme of travel toward said valve seat when said coil is deenergized such that said control valve is in a closed position, said armature being disposed at an extreme of travel away from said valve seat when said coil is energized, such that said control valve is in an open position.

29. The control valve according to claim 26, including a spring engaging said armature to urge said armature toward said valve seat when said control valve is in a closed position.

30. The control valve according to claim 27, wherein said armature cooperating with said valve seat to block fluid flow through said control valve when said armature is in a closed position, fluid flow through said control valve not being blocked when said armature is in an open position, the flux flow through said first generally radial flux flow path and the flux flow through said second generally radial flux flow path generating a force urging said armature from said closed position toward said open position when said coil is energized.

31. A control valve for controlling fluid flow in a hydraulic control unit, said control valve comprising:

a valve body, said valve body comprising a first body portion, a second body portion adjacent said first body portion, a sleeve portion adjacent said second body portion, and a third body portion adjacent said sleeve portion, said second body portion and said sleeve portion having a bore formed therein, wherein said first body portion comprises a valve seat, said second body portion comprises an adapter mounted on said valve seat, said sleeve being mounted on said adapter, and said third body portion comprises a pole cap mounted on said sleeve, said sleeve being formed from a non-ferromagnetic material and defining a region of increased magnetic reluctance, a stepped portion being formed on an end surface of said pole cap;

an armature slidably received in said bore of said sleeve portion and said second body portion, said armature comprising a first end, said first end of said armature providing at least two generally radial flux flow paths, said first end of said armature comprising a recess, a stepped portion being formed on an inner surface of said recess, said stepped portion of said armature being complementary to said stepped portion formed on said end surface of said pole cap and comprising at least two steps, said stepped portion of said armature being adapted to receive said stepped portion of said pole cap, at least two steps of said stepped portion of said armature forming radial magnetic poles for the generally radial transmission of magnetic flux alone said generally radial flow paths from each of said steps of said first end of said armature to respective associated steps of said stepped portion of said pole cap; and an electrical coil disposed about said valve body for selectively inducing a magnetic flux in said armature to urge movement of said armature.

32. The control valve according to claim 31, said first end of said armature being axially opposite said valve seat.

33. The control valve according to claim 31, wherein said valve seat is received within a bore of said adapter.

34. The control valve according to claim 31, wherein said adapter and said sleeve define a sub-assembly, said armature being slidably disposed in a bore of said sub-assembly, and said pole cap being received within a sleeve portion of said sub-assembly.

35. The control valve according to claim 32, said armature being disposed at an extreme of travel away from said valve seat when said coil is deenergized such that said control valve is in an open position, said armature being disposed at an extreme of travel toward said valve seat when said coil is energized, such that said control valve is in a closed position.

36. The control valve according to claim 32, including a spring engaging said armature to urge said armature away from said valve seat when said control valve is in an open position.

37. The control valve according to claim 32, wherein said armature cooperating with said valve seat to block fluid flow through said control valve when said armature is in a closed position, fluid flow through said control valve not being blocked when said armature is in an open position, the flux flow through said generally radial flux flow paths generating a force urging said armature from said open position toward said closed position when said coil is energized.

38. The control valve according to claim 32, said armature being disposed at an extreme of travel toward said valve seat when said coil is deenergized such that said control valve is in a closed position, said armature being disposed at an extreme of travel away from said valve seat when said coil is energized, such that said control valve is in an open position.

39. The control valve according to claim 32, including a spring engaging said armature to urge said armature toward said valve seat when said control valve is in a closed position.

40. The control valve according to claim 32, wherein said armature cooperating with said valve seat to block fluid flow through said control valve when said armature is in a closed position, fluid flow through said control valve not being blocked when said armature is in an open position, the flux flow through said generally radial flux flow paths generating a force urging said armature from said closed position toward said open position when said coil is energized.

41. The control valve according to claim 32, wherein said armature includes a second end opposite said first end, said armature including a ball pressed into an axial bore formed in said second end of said armature.

42. A control valve for controlling fluid flow in a hydraulic control unit, said control valve comprising:

a valve body, said valve body comprising a valve seat, an adapter mounted on said valve seat, a sleeve mounted on said adapter, said adapter and said sleeve having a bore formed therein, and a pole cap mounted on said sleeve, said sleeve being formed from a non-ferromagnetic material and defining a region of increased magnetic reluctance, a stepped portion being formed on an end surface of said pole cap;

an armature slidably received in said bore of said adapter and said sleeve, said armature comprising a first end, said first end of said armature being axially opposite said valve seat and providing at least two generally radial flux flow paths, said first end of said armature comprising a recess, a stepped portion being formed on an inner surface of said recess, said stepped portion of said armature being complementary to said stepped portion formed on said end surface of said pole cap and comprising at least two steps, said stepped portion of said armature being adapted to receive said stepped portion of said pole cap, at least two steps of said stepped portion of said armature forming radial magnetic poles for the generally radial transmission of magnetic flux along said generally radial flow paths from each of said steps of said first end of said armature to respective associated steps of said stepped portion of said pole cap; and an electrical coil disposed about said valve body for selectively inducing a magnetic flux in said armature to urge movement of said armature.

43. The control valve according to claim 32, wherein said valve seat is received within a bore of said adapter.

44. The control valve according to claim 32, wherein said adapter and said sleeve define a sub-assembly, said armature being slidably disposed in a bore of said sub-assembly, and said pole cap being received within a sleeve portion of said sub-assembly.

* * * * *

UNITED STATES PATENT AND TRADEMARK OFFICE
CERTIFICATE OF CORRECTION

PATENT NO. : 6,877,717 B2  
APPLICATION NO. : 10/389459  
DATED : April 12, 2005  
INVENTOR(S) : David E. Collins et al.

It is certified that error appears in the above-identified patent and that said Letters Patent is hereby corrected as shown below:

Column16, Line4, delete "alone" and insert --along--.

Signed and Sealed this

Sixth Day of March, 2007

JON W. DUDAS  
*Director of the United States Patent and Trademark Office*